(12) United States Patent
Stenzel et al.

(10) Patent No.: US 11,593,897 B2
(45) Date of Patent: Feb. 28, 2023

(54) SYSTEM AND METHOD FOR OPTIMIZATION OF CROP PROTECTION

(71) Applicant: BASF SE, Ludwigshafen (DE)

(72) Inventors: Klaus Stenzel, Ludwigshafen (DE); Maximilian Seitz, Limburgerhof (DE); Matthias Nachtmann, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 330 days.

(21) Appl. No.: 16/649,696

(22) PCT Filed: Sep. 10, 2018

(86) PCT No.: PCT/EP2018/074294
§ 371 (c)(1),
(2) Date: Mar. 23, 2020

(87) PCT Pub. No.: WO2019/063274
PCT Pub. Date: Apr. 4, 2019

(65) Prior Publication Data
US 2020/0273117 A1    Aug. 27, 2020

(30) Foreign Application Priority Data
Sep. 29, 2017 (EP) .................... 17194082

(51) Int. Cl.
*G06Q 50/02* (2012.01)
*A01G 22/00* (2018.01)
(Continued)

(52) U.S. Cl.
CPC .......... *G06Q 50/02* (2013.01); *A01B 79/005* (2013.01); *A01B 79/02* (2013.01); *A01C 21/007* (2013.01); *A01G 22/00* (2018.02)

(58) Field of Classification Search
CPC ...... G06Q 50/02; A01G 22/00; A01B 79/005; A01B 79/02; A01C 21/007
See application file for complete search history.

(56) References Cited

U.S. PATENT DOCUMENTS 7,626,496 B1   12/2009 Asher
2013/0332205 A1   12/2013 Friedberg et al.
(Continued)

FOREIGN PATENT DOCUMENTS

DE   102010023380 A1   12/2011
WO   WO-01/95162 A1   12/2001
(Continued)

OTHER PUBLICATIONS

International Application No. PCT/EP2018/074294, International Search Report and Written Opinion, dated Oct. 10, 2018.

*Primary Examiner* — Toan M Le
*Assistant Examiner* — Xiuqin Sun
(74) *Attorney, Agent, or Firm* — Marshall, Gerstein & Borun LLP

(57) ABSTRACT

A system (100), method and computer program product for optimization of crop protection. A generator module (120) accesses one or more configuration data structures (220) wherein the one or more configuration data structures include data fields to store crop data (221), advice data (222) related to respective crop data, and crop protection product data (223) related to respective advice. Further, it accesses a plurality of code snippets (230) wherein each code snippet (231, 232, 233) has a condition which relates either to at least one property field of the one or more data structures (220) or to a result of another code snippet, and further includes generic program logic associated with the condition, and wherein each property field is used in the condition of at least one code snippet. The plurality of code snippets (Continued)

is applied to the one or more configuration data structures to generate an advice logic program.

13 Claims, 7 Drawing Sheets

(51) Int. Cl.
*A01B 79/00* (2006.01)
*A01B 79/02* (2006.01)
*A01C 21/00* (2006.01)

(56) References Cited

U.S. PATENT DOCUMENTS

| | | |
|---|---|---|
| 2014/0236656 A1 | 8/2014 | Nielsen et al. |
| 2015/0351376 A1 | 12/2015 | Wichmann |
| 2016/0073573 A1* | 3/2016 | Ethington ............... G06Q 50/02 705/7.36 |
| 2016/0078375 A1 | 3/2016 | Ethington et al. |
| 2017/0169523 A1* | 6/2017 | Xu ....................... A01B 79/005 |
| 2019/0066234 A1* | 2/2019 | Bedoya ................ A01B 79/005 |

FOREIGN PATENT DOCUMENTS

| | | |
|---|---|---|
| WO | WO-2013/087103 A1 | 6/2013 |
| WO | WO-2017/119987 A1 | 7/2017 |

* cited by examiner

| 221-ID | 221-P1 | 221-P2 | 221-P3 | 221-P4 | 221-P5 | 221-P6 | 221-P7 | ... | 221-Pn |
|---|---|---|---|---|---|---|---|---|---|
| 1 | WBar | HORV | WGer | DE | RP | true | true | ... | true |

221-1 ↗

220

| 222-ID | 222-PaID | 222-P1 | 222-P2 | 222-P3 | 222-P4 | 222-P5 | 222-P6 | ... | 222-Pn |
|---|---|---|---|---|---|---|---|---|---|
| 1 | 1 | 11 | 13 | 400 | l/ha | i | null | ... | null |
| 2 | 1 | 24 | 39 | 250 | l/ha | h | null | ... | null |
| 3 | 1 | 13 | 39 | 250 | l/ha | h | null | ... | null |

| 223-ID | 223-PaID | 223-P1 | 223-P2 | 223-P3 | 223-P4 | 223-P5 | 223-P6 | ... | 223-Pn |
|---|---|---|---|---|---|---|---|---|---|
| 1 | 1 | APHIS | Fastac | 0240.. | 100 | ml/ha | AUT | ... | null |
| 2 | 2 | APHIS | Fastac | 0240.. | 125 | ml/ha | SPR | ... | null |
| 3 | 3 | null | Biath | 0075.. | 70 | g/ha | SPR | ... | null |
| 4 | 3 | null | Dash | 0050 | 1 | l/ha | SPR | ... | null |

| Test Case ID | Segment | Expected Result | Expected Product | Country | Region | Recent Crop | Recent Crop Eppo Code | Recent Crop BBCH Stage | Target(s) | Target EppoCode(s) | springOr Autumn Application | ... |
|---|---|---|---|---|---|---|---|---|---|---|---|---|
| 1 | Insecticide | 1; | Fastac | DE | RP | WBar | HORV | 11 | Aphid | APHIS | Autumn | |
| 2 | Insecticide | 1; | Fastac | DE | RP | WBar | HORV | 13 | Aphid | APHIS | Autumn | |
| 3 | Insecticide | false | Fastac | DE | RP | WBar | HORV | 10 | Aphid | APHIS | Autumn | |
| 4 | Insecticide | false | Fastac | DE | RP | WBar | HORV | 14 | Aphid | APHIS | Autumn | |
| 5 | Insecticide | false | Fastac | DE | RP | WBar | HORV | 11 | Aphid | APHIS | Spring | |
| 6 | Insecticide | false | Fastac | DE | RP | WBar | HORV | 11 | illegal | ILLEGAL | Autumn | |
| 7 | Insecticide | false | Fastac | DE | RP | WBar | HORV | 11 | Aphid;LeafB | APHIS;SETO | Autumn | |
| 8 | Insecticide | false | Fastac | XX | RP | WBar | HORV | 11 | Aphid | APHIS | Autumn | |
| 9 | Insecticide | false | Fastac | DE | XX | WBar | HORV | 11 | Aphid | APHIS | Autumn | |
| 10 | Insecticide | false | Fastac | DE | RP | Wheat | TRZA | 11 | Aphid | APHIS | Autumn | |

SYSTEM AND METHOD FOR OPTIMIZATION OF CROP PROTECTION

CROSS-REFERENCE TO RELATED APPLICATIONS

This application is the U.S. National Stage application of International Patent Application No. PCT/EP2018/074294, filed Sep. 10, 2018, which claims the benefit of European Patent Application No. 17194082.8, filed Sep. 29, 2017.

TECHNICAL FIELD

The present invention generally relates to optimization of crop protection and more particularly to code generation used for automatically constructing protection product mix instructions for appliances which can deploy a mix of crop protection products to a crop in a field.

BACKGROUND

Crop protection products (including at least chemical crop protection products and biological crop protection products) are used when growing crops to increase the yield. Preferably, crop protection products are chemical crop protection products." The term crop protection, as used herein, includes but is not limited to chemical crop protection, fertilization, and biological crop protection. Preferably, crop protection is chemical crop protection. Examples for chemical crop protection products are: pyraclostrobin, azoxystrobin, picoxystrobin, fluxapyroxad, cyproconazole, metconazole, epoxiconazole, mefentrifluconazole, boscalid, Kresoxim-methyl, dimoxystrobin, triticonazole, thiophanate-methyl, fipronil, broflanilide, abamectin, afidopyropen, alpha-cypermethrin, chlorfenapyr, chlorantraniliprole, cyantraniliprole, metaflumizone, pyridaben, teflubenzuron, thiamethoxam, imidacloprid, sulfoxaflor, aminopyralid, dicamba, diflufenzopyr, glyphosate, imazapyr, metazachlor, 2,4-dichlorophenoxyacetic acid (2,4-D), cinmethylin, pendimethalin, saflufenacil, tembotrione, topramezone, or products based on these active ingredients. Examples for biological crop protection products are: *Bacillus amyloliquefaciens* (an example for a product based on *Bacillus amyloliquefaciens*, strain MBI600, is Serifel®), *Beauveria bassiana* (an example for a product based on *Beauveria bassiana* is Broadband®), *Bacillus firmus, Bacillus subtilis, Bradyrhizobium, Bacillus pumilus, Bacillus licheniformis, Paenibacillus polymyxa, Paenibacillus epiphyticus, Pasteuria nishizawae, Penicillium bilaiae*, or products based on these microorganisms, as well as biochemical active ingredients such as fusaricidins and cis-jasmone, or products based on these active ingredients.

Crop, as used herein, is a plant or plant product that can be grown and harvested on a field. However, it is critical for an improved yield to apply the right crop protection products. for a particular crop at the right time to the right target. A crop protection product may include single Active Ingredients, combinations of Active Ingredients or combinations of Adjuvants. In other words, crop protection products, as used herein, include but are not limited to active ingredients, compositions, mixture and formulations comprising one or more active ingredients, formulants, co-formulants, adjuvants, inerts, solvents, and water. "Target" as used herein describes a particular infestation or a particular crop disease which can be treated by a crop protection measure. The crop protection measure can include the application of one or more crop protection products to the affected crop. Examples for crops are cereals, oil seed rape, corn, potatoes, sugar beets, rice, soybeans, sugarcane, cotton, fruits, vegetables, and legumes. Infestations include but are not limited to, microbial infestation insect pest infestation, weed infestation, or any challenges regarding plant health, plant nutrition or plant growth. Overall, at least several hundreds of targets are known in the art, which include weeds and, weed grasses, fungal, bacterial or viral pathogens and animalistic pests, especially insects. Many different crop protection products are available to counter such infestations or diseases. Such products can be segmented into segments, such as for example: insecticides (i), fungicides (f), herbicides (h), nitrogen stabilisators (n), growth regulators (g), nematicides, molluscicides, rodenticides, acaricides, bactericides, algaecides, antimicrobials, fertilizers, soil amendments, and soil additives. Commercially available compounds can be found in "The Pesticide Manual", 17th Edition, British Crop Protection Council (2015) among other publications, and its online database https://www.bcp-c.org/product/bcpc-online-pesticide-manual-latest-version.

In some cases, where a crop is affected by one or more targets, it can be advantageous to combine multiple products into a product mix (e.g., a spray mix of respective crop protection products) which is applied to the respective crop. However, the selection of the right products depends on many factors, such as for example, the growth stage of the crop, the weather conditions, the current season, recently applied products, etc. For mixtures of protection products additional selection parameters can be compatibility of products, use rate adaption, registration restrictions, resistance issues, or preferable mode of action combination. For example, systems and methods for applying liquid mixtures are described in WO2013/087103 A1.

Once a target is detected for a particular crop on a field, it can be advantageous to determine the appropriate spray mix instantaneously. For example, the weather conditions may change making an immediate application of the spray mix in the field mandatory. As a consequence, near-real-time determination of the spray mix becomes a requirement for an efficient yield. Further, new products may become available which may cause new interdependencies to other products. This may require a complete reevaluation of all application conditions of the various products during the various growth stages of the crop. The interdependencies and conditions are so complex that a human is not able to perform a determination of appropriate product mix instructions for respective spraying appliances.

SUMMARY

Therefore, there is a need to provide technical solutions which enable the determination of an appropriate mix of crop protection products in near-real-time for a particular crop at a particular crop growth stage and for at least one particular target, describing the situation and condition on the field. The term "mix of crop protection products" is intended to also include the case where a single crop protection product is used at 100%.

Embodiments of the invention as disclosed in the independent claims provide system, method and computer program product to optimize chemical crop protection by determining in near-real-time an appropriate spray mix instruction for a given crop situation (i.e. crop, growth stage, target) which enables immediate application of the spray mix for an improved yield.

In a first step of a computer-implemented method for optimization of chemical crop protection, a computer system executing the method accesses one or more configuration data structures referred to as "data structures" in the following. Such one or more data structures may either be stored by storage component of the computer system itself or they may be stored by a remote data storage device (e.g., on a remote server computer or on a remote database system). In case of remote access to a remotely stored data structure(s) the computer system can use standard communication interfaces and standard communication protocols to access the data structure(s). The one or more data structures include data fields to store data records of various types. It is to be noted that in the following description the term "(data) field" when used in the context of data records stored in the one or more data structures relates to a property field of the data structure where respective values are stored for the various data records. Sometimes, the term "field" is also used in relation to an agricultural field of a farm where crop is grown. For a person skilled in the art the respective meaning is clear from the context of the description. To avoid any confusion, sometimes data fields of the data structure(s) are also referred to as properties or property fields.

A first data record type refers to crop data wherein a crop data record stores at least crop identifier information for a particular crop and information regarding the applicability of various protection product segments for the particular crop. Examples of protection product segments include but are not limited to: insecticide (i), fungicide (f), herbicide (h), nitrogen stabilisators (n), growth regulators (g), nematicides, molluscicides, rodenticides, acaricides, bactericides, algaecides, antimicrobials, fertilizers, soil amendments, soil additives and a combination of two or more of said segments. For example, a crop data record can have a crop identifier field and one or more crop property fields. The crop identifier can be a number or name. Crop properties can, for example, include the name of the crop, geographical information about where the crop is grown, various crop protection product segments, etc.

A second data record type refers to advice data related to respective crop data. Advice data store information regarding recommendations for a particular crop with regards to respective protection product segments. For example, an advice data record can have a crop protection advice identifier associated with a plurality of advice properties for the respective crop. The advice properties include at least one growth stage code for the respective crop and one or more recommendation properties. For example, the advice identifier can be a number or a name. For example, the crop to which the advice relates, can be indicated in a field which stores the crop identifier of the respective crop data record. Other pointer mechanisms may be used instead by a skilled person. The growth stage code may be a BBCH code, Zadoks code, Feekes code, Haun code or any other code with is appropriate to indicate the growth stage of a crop at sufficient granularity.

A third data record type refers to crop protection product data related to respective advice data. Crop protection product data records store identifier information about protection products for specific targets and their application properties in relation to related advices as well as field specific conditions. For example, a crop protection product data record can have a crop protection product identifier (number or name) and one or more protection product properties for a respective target. Each target corresponds to a particular infestation or a particular crop disease. Field specific conditions vary from field to field and can be entities such as soil type, water conditions, previous applications on the field.

In a second step, the computer system accesses a plurality of code snippets. Each code snippet has a condition which relates either to at least one data field property of the one or more data structures or to a result of another code snippet. Further, a code snippet includes generic program logic associated with the condition. Each property field defined in the configuration data structures is used in the condition of at least one code snippet. In other words, the condition of a snippet is checking the data field property value of at least one respective configuration property for a particular data record. The generic program logic part of the code snippet can be seen as a generic code template which defines how executable code is to be generated dependent on the outcome of the condition check based on respective configuration values in the configuration data structure(s). Because all configuration properties (i.e. all property fields of the data structures(s)) are checked by respective code snippet conditions, the system can generate executable code for each configuration property. The option to use the result of a code snippet in the conditions of other snippets allows to reflect interdependencies between various configuration properties across multiple hierarchy levels. Complex decision trees with numerous hierarchy levels can thus be modeled in the advice logic for determining appropriate product mix instructions.

The executable code generation is then performed in a third step by applying the plurality of code snippets to the one or more data structures to generate an advice logic program by transforming the generic program logic of each code snippet into executable program logic in compliance with the respective conditions and respective field values. In this step, the system generates for all data records of the configuration data structure(s) the executable program logic in that every configuration property is checked by one or more associated code snippets via the corresponding condition and leads to a corresponding portion of an executable advice logic program when the generic code template is configured according to the configuration property values. For this purpose, a generator of the system includes a program which is configured to arrange all code snippets in the correct order and to replace placeholders in the code snippets with configuration data from the configuration data structure(s). Applying the code snippets to the configuration data structures generates an executable program implementing decision trees which are defined by the data structures. Such decision trees provide guidance to the system how to generate a particular advice for a mix of protection products which should be applied in a particular given crop situation (the situation on a real world field). The correct order of the code snippets is therefore defined in the generator function in accordance with the decision trees.

The particular crop situation of interest is received as input which includes at least a particular crop identifier, a particular target identifier and a particular growth stage code representing the real world field situation for the crop (crop situation). The crop situation may be received as input from a human user (e.g., a farmer) or it may be received from another system. For example, modern camera systems can be mounted on a tractor in the field and can be configured to automatically identify crop type, potential diseases and growth stage of the crop by applying diagnostic image processing methods and provide the diagnosis result to the computer system for advice generation. Commercially available direct injection-type systems can be controlled by control instructions reflecting the generated advice.

The system then applies the generated advice logic program to the received input and generates a crop protection product mix instruction for treatment of the real world field situation. In other words, the product mix instruction determines a particular mix of protections products which are to be applied to the respective crop situation as defined by the crop identifier with the particular target identifier and the particular growth stage code. Because all configuration properties are covered by the generated advice logic program, the entire knowledge regarding the decision trees with all the interdependencies between various configuration properties as defined in the various code snippets is included in the generated executable advice program logic. This program can be executed instantaneously (in near-real-time) in response to receiving the input about the crop situation. The result of this step is an advice which provides information about one or more protection products to be applied to the crop in the current situation. In other words, the provided crop protection product mix instruction includes the information about the respective product identifier(s) and the respective amounts to be added to the protection product mix with the aim optimize the yield in the field.

In one embodiment, the generated crop protection product mix instruction is provided as a control instruction for a sprayer appliance to generate a tank mix with one or more crop protection products in accordance with the generated advice logic program. A sprayer appliance typically includes one or more tanks to store the respective protection products, mixing means to mix the protection products in accordance with the product mix instruction, and one or more spray valves to distribute the resulting product mix on the field where the crop with the at least one target is grown. Some of the sprayer appliances are commercially available. In this embodiment, the control instruction is generated in a machine readable format which is suitable to control spray valves of the sprayer appliance so that the product mix can be produced in accordance with the product mix instruction. Modern agricultural equipment is available which allows to integrate such sprayer appliance with the corresponding product tanks into machinery used in the field. As a consequence, this embodiment allows a farmer to immediately apply the appropriate product mix for the current crop situation automatically while cruising the field. Sprayer appliances are advantageously used for mixing liquid protection products. Some protection products are of solid nature. For such protection products a person skilled in the art will use appropriate mechanical mixing devices to implement the inventive concept.

In one embodiment, the computer system is further configured to generate test cases for verifying the generated program logic to prevent deployment of the program logic for production use in cases where the execution leads to results for mix instructions which are inconsistent with the generated test cases. In other words, deployment of the executable program logic for production use is only allowed in cases where the verification of the program logic provides only mix instructions in compliance with positive test cases. This embodiment contributes to improved robustness of the generated program logic. Thereby, it reduces the risk of distributing protection products on the field that may cause harm to the grown crop or which may not be in line with local practice of the respective country.

Further aspects of the invention will be realized and attained by means of the elements and combinations particularly depicted in the appended claims. It is to be understood that both the foregoing general description and the following detailed description are exemplary and explanatory only, and are not restrictive of the invention as described.

BRIEF DESCRIPTION OF THE DRAWINGS

FIG. 7 illustrates example test cases stored in a test case database; and

DETAILED DESCRIPTION

Figure 1:
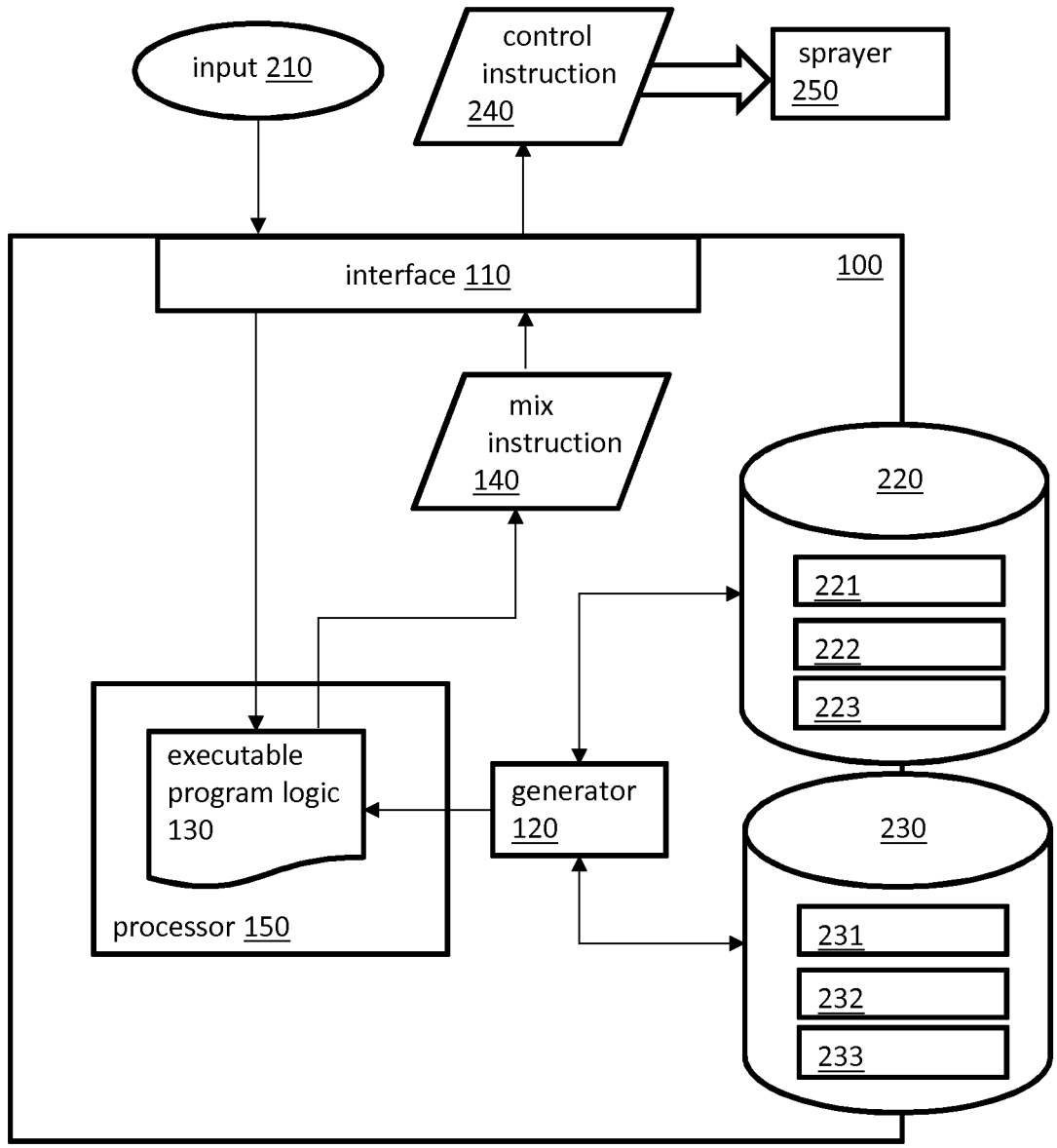
FIG. 1 is a simplified block diagram of a computer system for optimization of chemical crop protection according to an embodiment.
Figure 2:
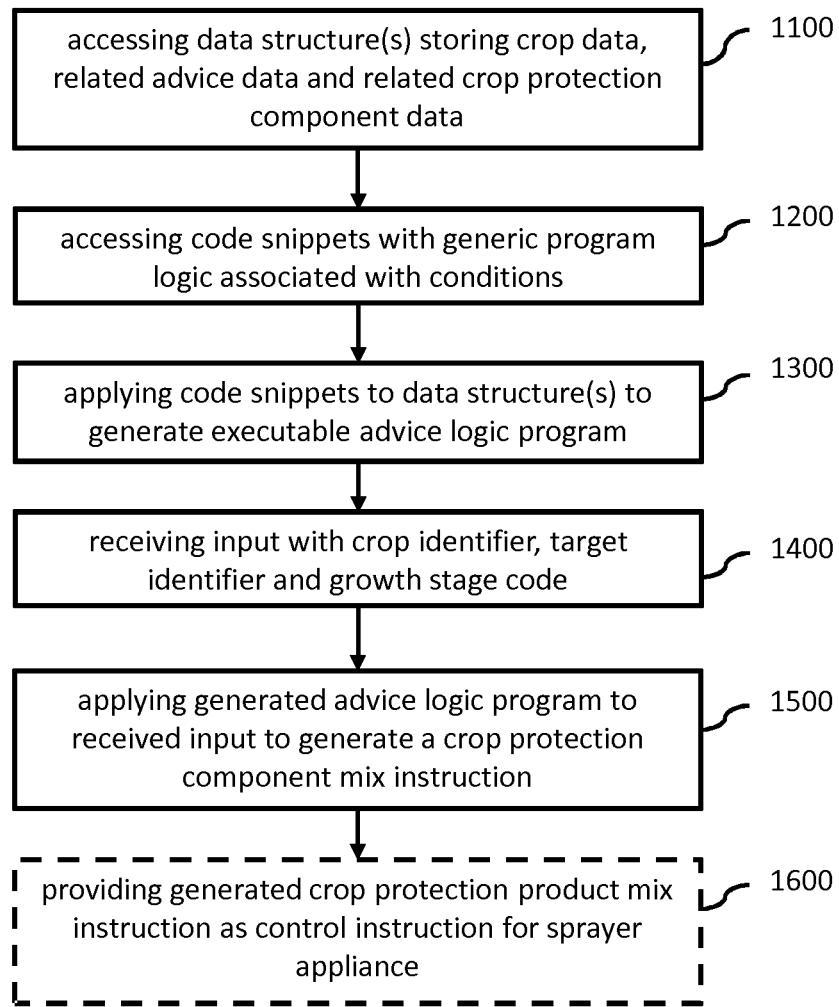
FIG. 2 is a simplified flow chart of a method for optimization of chemical crop protection performed by the computer system according to an embodiment.

FIG. 1 is a simplified block diagram of a system 100 for optimization of chemical crop protection according to an embodiment of the invention. FIG. 1 will be discussed in the context of FIG. 2 which is a simplified flow chart of a method 1000 for optimization of chemical crop protection performed by the system 100 of FIG. 1 according to an embodiment of the invention. Reference numbers therefore may refer to FIG. 1 or FIG. 2.

The computer system has a generator module 120 which can generate executable advice program logic 130 based on corresponding configuration data. The advice program logic 130 implements the knowledge about which crop protection product(s) should be applied to which crop(s) in which situation. Thereby, a particular situation (field situation) is characterized in that a particular crop seeded on the field shows indicators for a particular target. The advice logic program 130 when applied to the particular situation identifies one or more appropriate protection products suitable treat the particular target in near-real time and generates a mix instruction 140 as the advice for the respective product mix which is suitable to combat the target in the particular situation.

The particular field situation is received as input 210. The input 210 includes at least a particular crop identifier, a particular target identifier and a particular growth stage code. In other words, the input provides the information about the crop which is grown in the respective field, about the target which affects the crop and which may be an obstacle to obtaining an efficient yield in the field, and the information about the current growth stage of the crop (field situation). Besides this information the input may include more optional information to specify the field situation in more detail. Examples of optional input information are shown further down in the description.

The generator 120 is communicatively coupled with one or more configuration data structures 220. The configuration data structure(s) may be stored on a remote storage device which is accessible by the generator 120 via a standard communication interface. Alternatively, the configuration data structure(s) may be stored in a memory component of the computer system 100. The generator 120 accesses 1100 the configuration data structure(s) 220 to retrieve configuration data which is then used for generating the advice program logic 130. The configuration data is stored in data fields of the one or more configuration data structures. Three types of configuration data can be distinguished: crop data 221, advice data 222 and crop protection product data 223. For example, a person skilled in the art can implement the configuration data structure(s) using relational database tables, XML files or any other data structure construct which is suitable to store structured data. The following overview of the various configuration data types is complemented by the detailed example description of FIG. 4.

Crop data 221: a crop data record 221-1 stores at least crop identifier information for a particular crop and properties regarding the applicability of various protection product segments for the particular crop. The crop identifier is a unique representation of a respective crop. This can be a unique sign like, for example, a unique number or a unique name. Property fields of a crop data record may include information regarding a region where the crop is grown or information about potential protection product segments. Examples of well-known protection product segments are: insecticides, fungicides, herbicides, Growth Regulators, Nitrogen Stabilizers or a segment which extends over a combination two or more of such protection product segments.

Advice data 222: a particular advice data record is related to a respective crop data record. Each advice data record stores advice identifier information and properties regarding recommendations for the related crop with regards to a respective protection product segment. For example, the relation between the particular advice data record and the related crop data record can be implemented with a data field in the advice data record that stores a pointer to the respective crop data record. The property fields of the advice data records include at least a growth stage code indicating the growth stage of the crop to which the advice data record is applicable.

Crop protection product data 223: a crop protection product data record is related to a respective advice data record. Each advice data record stores identifier information about a particular protection product potentially applicable for one or more target(s). In other words, a unique identifier of a protection product is stored together with information pointing to at least one target which describes a particular infestation or crop disease that can be treated by a crop protection measure involving the application of said protection product. The information pointing to the at least one target can be a data field value indicating the name of one or more targets or it can be a pointer (a reference) to a data structure where respective targets are listed. For example, the relation between a crop protection product data record and a related advice data record can be implemented with a data field in the crop protection product data record that stores a pointer to the respective advice data record.

The configuration data structure(s) can be seen as the implementation of a knowledge base which reflects decision trees regarding the application of certain protection products to respective crops under certain field situations. Such configuration data is now converted by the generator 120 into program logic 130 with program statements reflecting the implementation of the decision tree in a computer readable and executable format.

For this purpose, the generator 120 further accesses 1200 a plurality of code snippets 230. The code snippets can be stored on a remote storage device which is communicatively coupled with the computer system 100, or they may be stored in an internal memory component of the computer system 100. A code snippet 231, 232, 233, as used herein, is a piece of generic software code which can be used to generate an executable code portion based on respective configuration data. A generic code snippet includes a non-executable code template which becomes executable through configuration.

Figure 3A:
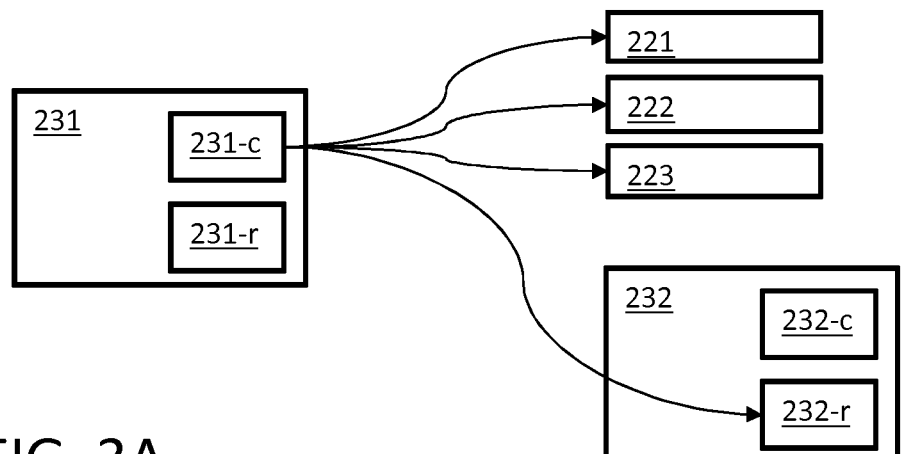
FIG. 3A illustrates the structure of code snippets and their interdependencies.

Turning briefly to FIG. 3A, each code snippet 231 has a condition 231-$c$ which relates either to at least one property field of the one or more configuration data structures 221, 222, 223 or to a result 232-$r$ of another code snippet 232. Further, each code snippet 231, 232 includes generic program logic 231-$r$, 232-$r$ associated with the condition 231-$c$, 232-$c$. The generic program logic provides a template for the portion of the code snippet which provides a result once the snippet is transformed into executable logic based on the configuration data and executed by a processor module 150 of the computer system 100. Thereby, each property field of the data structure(s) 220 is used in the condition of at least one code snippet. In other words, each property value in any one of the configuration data structure(s) is covered by at least one code snippet which performs some check on said property value and generates corresponding program logic dependent on the corresponding configuration data.

Figures 3B, 4:
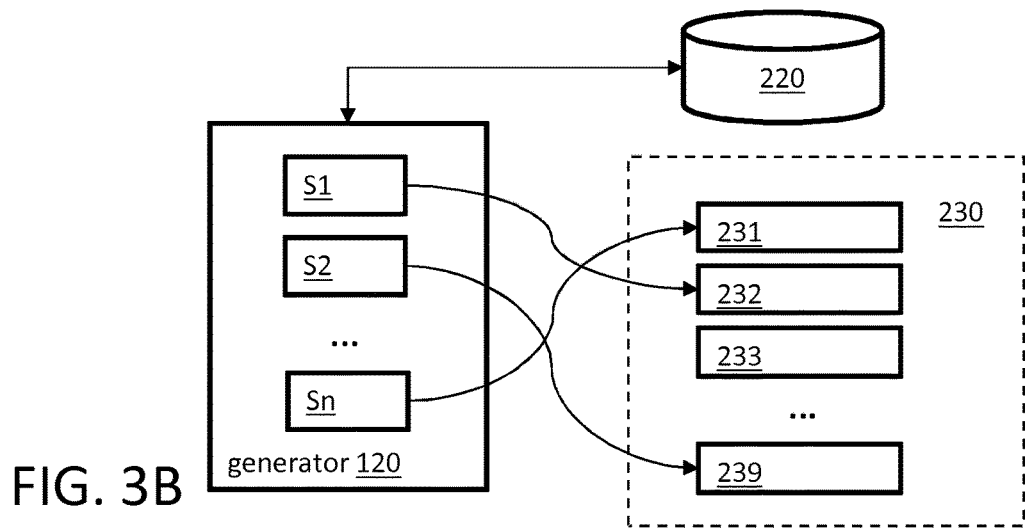
FIG. 3B illustrates a structure example of a generator according to an embodiment.
FIG. 4 is an example of configuration data structures used for advice logic generation according to an embodiment.

Turning back to FIGS. 1 and 2, the generator 120 further applies 1300 the plurality of code snippets 230 to the one or more configuration data structures 220 to generate an advice logic program by transforming the generic program logic of each code snippet into executable program logic 130 in compliance with the respective conditions and respective data field values. That is, the generator is generating executable program logic from the code snippets by arranging them in a correct order and by replacing placeholders in the generic code templates of the code snippets with corresponding configuration data of the configuration data structure(s). A correct order is defined as an order which leads to a program that can run without errors. In other words, a correct order takes into account possible dependencies between snippets so that each input required by a code snippet has been provided as output by a previous snippet. A detailed example with example code snippets and a resulting example of executable advice program logic is described in the context of FIG. 4. Turning briefly to FIG. 3B, the generator 120 includes a list of ordered statements S1 to Sn with each statement referencing a respective code snippet. In the example, statement S1 references code snippet 232, statement S2 references code snippet 239 and statement Sn references code snippet 231. This allows to generate the executable code portions based on the corresponding snippets in the correct order (defining the execution sequence) with the configuration data 220 referenced by the code snippets.

Turning back to FIGS. 1 and 2, the computer system 100 further has an interface 110 to receive 1400 input 210 comprising at least a particular crop identifier, a particular target identifier and a particular growth stage code. As mentioned earlier, this input can be seen as a minimum data set to describe the (agricultural) field situation where the crop is grown. The input can be enhanced by optional information like, for example, a field indicator specifying a particular field on a farm where the crop is growing, indicators regarding earlier protection product applications, soil moisture, etc. This type of optional information can typically be retrieved from a farm management system, from current or past weather observations, it may be provided manually as an input from the user (e.g., the farmer), etc.

A processor module 150 of the computer system 100 applies 1500 the generated advice logic program 130 to the received input 210 to generate a crop protection product mix instruction 140 applicable to the respective crop identifier with the particular target identifier and the particular growth stage code (i.e. the field situation provided by input 210). The processor module 150 can be implemented as a compiler or interpreter with a runtime environment which is able to execute the generated program logic 130. The input 210 provides the parameters to the program logic 130 which are required by the generated program to run. The result of the program logic execution is the mix instruction 140 which includes the information about which of the available protection products should be applied to the crop in the field to provide treatment with regards to the identified target. It is to be noted that the instruction may also include a single protection product (100%) or it may include multiple protection products with respective percentages or absolute quantities.

The mix instruction 140 may be provided in a human readable format so that the user can then control a sprayer appliance 250 to generate a tank mix with one or more crop protection products in accordance with the result provided by the execution of the generated advice logic program. As a consequence, a farmer being in the field can provide the current field situation to the computer system 100. A minimum input set 210 of field parameters may be automatically enhanced by further field specific information stored in a field management system. The input is then processed by the processor module 150 in near-real time and the mix instruction 140 can also be provided in near-real time to the farmer. This enables the farmer to instantaneously react to the current field situation with an ideal protection product or product mix to initiate treatment in relation to the target. Such spray-mix application can be time critical. For example, if a *fusarium* infestation is predicted, the system can immediately react with an appropriate product recommendation based on the infestation situation and the time. Thereby, it is advantageous to meet the very narrow product application time window of one to four days which is often hardly met in practical farm operations. Another example is an upcoming change of the weather conditions (e.g., forecasted rain, thunderstorm, temperature fall, etc.) which may constrain the time window for a successful treatment to a limited time interval starting at the current point in time. For example, if a rainfall is forecasted for the next day, the famer may only have this day to apply the right treatment to the entire field. A near-real time determination of the appropriate product mix instruction 140 is therefore advantageous for optimized treatment and chemical crop protection.

It can be advantageous to use the result for fully automated control of such a sprayer appliance. In this embodiment, the computer system 100 further includes a conversion module which converts the generated crop protection product mix instruction 140 into a control instruction 240 for a sprayer appliance 250 to generate a tank mix with one or more crop protection products in accordance with the generated advice logic program. The control instruction 240 can then be provided 1600 to the sprayer appliance 250 by the interface 110. The conversion module can be implemented as a part of the interface 110.

FIG. 4 is an example of configuration data structures 221, 222, 223 used for advice program logic generation according to an embodiment. In the example of FIG. 4, the configuration data is stored in database tables of a relational database. A person skilled in the art may use other data structures for storing the configuration data, such as for example, a graph database or an XML database.

In the example, the tables 221, 222, 223 illustrate possible data structures with example data records for crop data, advice data and crop protection product data, respectively. In this simplified example, a winter barley (crop) field is infected by aphids (target). Particular insecticides (i) are available to be mixed and to be distributed to the winter barley field. The description explains by way of example how a computer generates program logic, that is—for simplicity—specialized to deal with insecticides, how the program logic can be verified prior to use, and how the program logic assists the farmer to select a particular insecticide in particular application quantities.

A crop data record 221-1 has a crop identifier 221-ID and one or more crop properties 221-P1 to 221-Pn. The entries shown in the tables are abbreviations of the actually stored values. In the example, 222-P1 stores the crop name in English "Winterbarley" ("WBar" stands for Winterbarley). 221-P2 stores the crop eppo (or EPPO) code HORVW (here shorted to "HORV"). 221-P3 stores the crop name in German "Wintergerste" (WGer). 221-4. Of course, one crop name is sufficient and translations into other languages are optional. Also the information stored in 221-P4/P5 about the region where the crop is grown" "Germany/Rheinland Pfalz" (DE/RP) is optional. In the example, 221-P6 to 221-Pn include the information whether products of a particular product segment (e.g., insecticide 221-P6 or fungicide 221-P7) can be applied to the crop Winterbarley. The value "true" indicates that the respective product segment is applicable.

The advice data table 222 stores advice data records related to respective crop data. Each advice data record 222-1, 222-2, 222-3 has a crop protection advice identifier 222-ID associated with a plurality of advice properties 222-P*. Further, 222-PaID stores the ID of the crop data record to which the advice relates. In the example, all three advice data records relate to the crop data record 221-1. Each advice data record stores at least one growth stage code which indicates the growth stage of the respective crop to which the advice relates. In the example, a range of growth stage codes is defined through the property fields 222-P1 (from) and 222-P2 (*to*). In the example, BBCH codes are stored in those fields. The data record 222-1 specifies a range from 11 to 13, the data record 222-2 from 24 to 39 and the data record 222-3 from 13 to 39. The fields 222-P3 and 222-P4 provide information about the water quantity which is to be applied for the respective advice. For example for the data record 222-1 it is to be read as 400 l/ha. The field 222-P5 specifies the product segment to which the advice relates. For example, the advice 222-1 relates to insecticides "i" whereas the advices 222-2 and 222-3 relate to herbicides "h". Field values "null indicate that the respective field does not apply to the respective advice data record.

The crop protection product data table 223 stores crop protection product data records 223-1, 223-2, 223-3, 223-4. Each crop protection product data record has a crop protection product identifier 223-ID and relates to a respective advice data record. In the example, this relation is stored in the field 223 PaID pointing at the ID of the related advice data record. For example, protection product data records 223-1, 223-2 relate to advice data records 222-1, 222-2, respectively. Crop protection product data records 223-3 and 223-4 relate both to advice data record 222-3. Further, property field 223-P1 stores a target name if the respective data record relates to the target. There can be multiple property fields to specify target information or there can be multiple targets specified in the same property field (e.g., separated by a corresponding separator sign). In the example, protection product data records 223-1, 223-2 relate to a target called APHISP (here shorted to "ABHIS"). The other two data records do not relate to a target specified by this property field. Field 223-P2 stores the protection product names Fastac SC (Fastac), Biathlon 4D (Biath) and Dash E.C. (Dash). In the example, 223-P3 stores the registration numbers for the respective products. 223-P4 and 223-P5 store the application rates for the respective products. 223-P6 stores the season when the product can be applied (e.g., autumn (AUT) or spring (SPR)).

In any of the three example data structures for storing configuration data many more property fields may exist to provide further information which may be relevant for certain advices. The following code examples illustrate how the generator generates parts of the executable advice program logic based on the example configuration data. First, a set of example code snippets is discussed which form the basis for the logic generation. Then, an example of JAVA code is described which can generate executable advice logic which is illustrated as an R code example. R is a language and environment for statistical computing and graphics.

Code Snippet Examples:

In the following code examples the sign "#" indicates a comment or explanation of the respective code portion. The comment portion is terminated by the end of the line. The variables used in the code examples (e.g., cropName (221-P1), BBCHFrom (222-P1), BBCHto (222-P2), eppoCodes (223-P1), pName (223-P2), etc.) correspond to respective property fields of the configuration data structure(s). An example list of possible property fields which can be used as configuration data is given in table 1.

The following code snippet is used for generating the Head of an R-Insecticide-Logic by adding the corresponding cropName which comes as a variable in the received input.

```
public static String generateHeadForInsecticideLogic(String cropName)
{ # method
# name
        String s = "" + # defines the string including the following lines;
# + (plus) means the string continues in the next line
# \n means a line break
```

```
"insecticideLogic <- function( ) {\n"+ # function name in R
"       products <- matrix(,nrow=0,ncol=10,byrow=TRUE); \n" + #
        resets the product matrix
"       recentBBCH <- getRecentCropsBBCH( );\n"; # defines a call
# to get the BBCH value, ends the snippet-string
        return s; # returns the composed R-Code-Snippet-String
}
```

The following code snippet is used to start a new code snippet block for a new product check.

```
public static Object startNewProductCheck( ) {
        String s = "" + # starts the snippet-string
"       dontUseIt <- FALSE;\n"; # initiates the variable, ends the
        snippet-string
        return s; # returns the snippet-string
}
```

The following code snippet is used to perform a check whether the requested BBCH code (crop growth stage code included in the input) is inside the boundaries of the BBCH-From 222-P1 and BBCH-To 222-P2 values. This code snippet is also an example where the condition relates to the result of another code snippet. The value of the variable "dontUseIt" is used in the "if" condition of the snippet. However, the value is set as a result value of another code snippet which is used earlier.

```
public static String InbetweenBBCH(String BBCHFrom, String BBCHto)
{ # function
including two parameters to be set in the snippet-string
        String s = "" +
"       if (isInbetweenBBCH("+BBCHFrom+","+BBCHto+",
        recentBBCH)==FALSE) {\n" +
"               dontUseIt <- TRUE; \n" +
"       }\n"; # this snippet verifies whether the actual BBCH is in-between
        the boundaries,
which are coming as variables
        return s; # returns the snippet-string
}
```

The following code snippet is used to verify whether the requested target is a target represented by an eppoCode for which the Product is being allowed to be used for or, in other words, if it is present in the product data records 223-P1.

```
public static String ConsiderTheseTargetEppoCodes( # function including
        String eppoCodes) { # variable with the expected target eppo codes
        String s = "" + # defines the string
"       if ((isAtLeastOneOfTheTargetEppoCodes(\""+eppoCodes+"\")==FALSE)) {\n" +
"               dontUseIt <- TRUE; \n"+
"       }\n"; # ends the snippet-string
        return s; # returns the snippet-string
}
```

The following code snippet is used to verify if the given number of applications per product is less than the allowed number of applications as stored in a property field of the product data records 223-* (not shown).

```
public static String ConsiderNumberOfApplicationsOfThisProduct( # function
String pName, String numberOfApplicationsOfThisProduct) { # including two variables
        String s = "" +
"       if (numberOfApplicationsOfThisProduct(\""+pName+"\") >=
"+numberOfApplicationsOfThisProduct+") {\n" +
"               dontUseIt <- TRUE; \n" +
```

```
"            }\n";
             return s;
}
```

This snippet verifies whether the season is the right one (Spring) for the product to be applied (data field property 223-P6).

```
public static String ConsiderOnlySpringIsAllowed( ) { # function without variables
                    String s = "" + # begins the snippet-string
" if (isSpring( )==FALSE) {\n" +
"                   dontUseIt <- TRUE; \n" +
"             }\n";
                    return s; # return the snippet-string
}
```

This snippet verifies whether the season is the right one (Autumn) for the Product to be applied (in product data records 223-P6)

```
public static String ConsiderOnlyAutumnIsAllowed( ) { # function without variables
                    String s = "" +
" if (isAutumn( )==FALSE) {\n" +
"                   dontUseIt <- TRUE; \n" +
"             }\n";
                    return s; # return the snippet-string
}
```

The following Java code example shows a portion of an example embodiment of the code generator which brings the above code snippets in the right order as per the configuration data structure(s) to generate the executable advice program logic. The logic generation logic can be written in other programming languages. The following example is not seen to be limiting but only as one possible implementation.

As for the code snippet examples, the sign "#" indicates again a following comment. The comments provide guidance for a skilled person about the general function of the respective coding portions independent of the specific Java implementation example. The comment "if the property is set" refers to the value of the respective property field for the respective data record.

```
Java code example for R code generation:
# creates example parts of the Insecticide logic (e.g., this may be the starting point of
the program logic. Other code portions look similar)
[...]
if (rData.i.toBeConsidered==true) { # checks whether in the crop data
# structure 221 insecticide is allowed for treatment
# (e.g., data field 221-P7) and whether a logic is to be created for insecticides
        addHead(RSnippet. generateHeadForInsecticideLogic (rData.cropName));
# if yes, then add the logic function code snippet
        addAdvices(rData.i.advices); # add now all advices from the
# insecticide segment as available in the configuration data structure(s)
        closeHead(RSnippet.CloseInsecticide( )); # close the function
# for the insecticide logic
} else { # else, if no insecticide logic to be created,
# enter empty methods
        addHead(RSnippet.NoInsecticide(rData.cropName));
        closeHead(RSnippet.CloseInsecticide( ));
}
[...]# continue with the other segments, finally close the logic
---
# adds now all advices / products which relate to
# the insecticides coming from the configuration data structure(s)
# the following method gets an array of advices.
# The loop runs for every advice
private void addAdvices(ArrayList<Advice> advices) {
        for (int i = 0; i < advices.size( ); i++) {
            Advice a = advices.get(i);
            addCode(RSnippet.startNewProductCheck(a)); # adds a code snippet
# to start a new product check
            addCheck(RSnippet.InbetweenBBCH(a.BBCHFrom, a.BBCHTo)); # adds
# a code snippet to check whether the BBCH is
# in-between the expected range
```

```
[...]
# continue here with other code snippets on the
# advice level for other property fields of the configuration data structure(s).
        for (int j = 0; j < a.products.size( ); j++) { # loop for all protection
# products referring to this advice
        Product p = a.products.get(j);
        if (p.considerTheseTargetEppoCodes!=null) { # if the property
# is set, add the code snippet to check the target eppo codes
            addCheck(RSnippet.ConsiderTheseTargetEppoCodes
(p.considerTheseTargetEppoCodes));
        }
        if (null!=p.numberOfApplicationsOfThisProduct &&
!"0".equals(p.numberOfApplicationsOfThisProduct)) { # if the property
# is set, add the check to verify
# the number of applications for this product
            addCheck(RSnippet.ConsiderNumberOfApplicationsOfThisProduct
(p.pName,p.numberOfApplicationsOfThisProduct));
        }
        if ("SPRING".equals(p.springOrAutumnApplication)) { # if the property
# is set, consider the advice only in spring
            addCheck(RSnippet.ConsiderOnlySpringIsAllowed( ));
        }
        if ("AUTUMN".equals(p.springOrAutumnApplication)) { # if the property
# is set, consider the advice only in autumn
            addCheck(RSnippet.ConsiderOnlyAutumnIsAllowed( ));
        }
[...]
# continue here with other code snippets
# on the product level for other properties of the
# configuration data structure(s)
[...]
# adds the code snippet to END a product check
        r.append(" if (dontUseIt==FALSE) {\n"); # if the variable
# is false, add the products
        for (int j = 0; j < a.products.size( ); j++) { # add as many products
# as are available in the configuration data structure(s)
# for this advice, and recommend them
        Product p = a.products.get(j);
        String methodName = "addProductAndFinishThisCombination";
        if ((j+1) < a.products.size( )) {
          methodName = "addProduct";
        }
# the following lines add the single product of this loop
# into the products matrix
        String s = "" +
"    products <- "+methodName+"(products,\""+
p.pName+"\",\""+p.pRegNr+"\",\""+p.pAppRate+"\",\""+p.pAppRateUOM+"\",\""+a.wate
rRecommendation+"\",\""+a.waterRecommendationUOM+"\",\""+a.BBCHFrom+"\",\""+
a.BBCHTo+"\");\n";
        r.append(s); # this adds the previous
# string to the overall logic string
        }
        r.append(" }\n"); # this finishes the previous
# loop and adds it to the string
    }
# here the code snippet to END a product check terminates
# after the adding of the protection product(s) into the matrix.
# finally, the string object r contains the whole string representing the logic
```

The following R-code example is the result of the generator when having applied the example code snippets to the example configuration data structures. Again, the sign "#" indicates again a following comment.

```
R-code example for generated advice logic program:
InsecticideLogic <- function( ) {                       # name of the subroutine
    products <- matrix(,nrow=0,ncol=10,byrow=TRUE)      # initialize the products matrix
    recentBBCH <- getRecentCropsBBCH( );                # call to get the BBCH stadium
# from the received input (e.g., the farmer's request)
#// starting a new product check for the product "Fastac SC Super Contact"
    dontUseIt <- FALSE;                                 # initialize of a variable
    if (isInbetweenBBCH(11,13, recentBBCH)==FALSE) {    # if condition: if outside the
# bbch boundaries, ignore this product by setting this variable
      dontUseIt <- TRUE;
    }
    if ((isAtLeastOneOfTheTargetEppoCodes("APHISP")==FALSE)) {
# another if condition
# if the target APHISP is not requested,
```

```
# ignore this product by setting the variable
dontUseIt <- TRUE;
}
if (numberOfApplicationsOfThisProduct("Fastac SC Super Contact") >= 1) { # if
dontUseIt <- TRUE; # condition, if product is used already, don't allow to use it
} # a second time
if (isAutumn( )==FALSE) {                          # advice is only allowed in the Autumn
dontUseIt <- TRUE;                                 # if currently it is not Autumn, ignore this product/advice
}
if (dontUseIt==FALSE) {                            # put the product into the matrix
# but only if variable is not set to true
# which means to ignore this product as per previous checks
products <- addProductAndFinishThisCombination(products,"Fastac SC Super
Contact","024018-00","100","ml/ha","400","l/ha","11","13"); # set all
# required parameters for this product / advice
}
```

This generated advice logic program example can then be applied to the received input specifying the field condition. For example, the received input may include the information:
crop identifier: cropName=Winterbarley
target identifier: eppoCode=APHISP (i.e. a particular insect—a plant louse—that reduces the yield of the crop)
growth stage code: BBCH=12
A code for the current season (e.g., spring, autumn) does not necessarily need to be an explicit input parameter as it can be automatically derived by the system through a comparison of the current date associated with the input request and a respective calendar.

As a result, this part of the generated advice logic generates an entry for the crop protection product mix instruction including the following advice information: "Fastac SC Super Contact", "024018-00", "100", "ml/ha", "400", "l/ha". The mix instruction can then be converted or transformed into a machine readable format which complies with the instruction syntax of a sprayer appliance to be used as a control instruction for said sprayer. Such conversion programs are generally known in the art as they basically correspond to a mapping structure which can map the elements of the generated mix instruction to syntax elements of a control language which can be interpreted by a control unit of the sprayer.

TABLE 1 list of potential property fields used in the configuration data structure(s).

| Property Name | Description |
| --- | --- |
| pName | Product name (can also be the Active Ingredient name). |
| pRegNr | Registration Number of this Product in that country. |
| pAppRate | Recommended Application Rate of this product. |
| pAppRateUOM | Unit of measure of the Application Rate of this product (e.g. ml/ha, L/a etc.). |
| numberOfApplicationsOfThisProduct | Maximum Numbers of Applications of this Product per Field and Per Season (e.g. 1 means that this product is allowed to be applied one time, 0 means there is no limitation). |
| considerTheseTargetEppoCodes | The logic must consider these listed Target Eppo Codes (Separated). Specialty: for Herbicides this property is to be empty since the Cross List (a Target-Weed/Weed Grass-sub-structure) is being used whether the Weeds & Weed Grasses are to be used for special Products/Product combinations. |
| considerTheseTargetNames | Same as considerTheseTargetEppoCodes but with Target names. |
| springOrAutumnApplication | Check: verifies if the day, the advice request comes into the Advice Engine, is in Spring, Autumn or if the check can be ignored. Acceptable values are [SPRING, AUTUMN, "", or null] |
| nightTemperatureBelowNotAllowed | Defines the lower temperature limit the product is allowed (E.g. −5 means, the product can be applied till −5 degrees but not below that value). |
| nurseCropAllowed | Potential values are [MONOCOTYL, DICOTYL, NONE, null, ""]. If a value is entered, this value is allowed as per advice request to match this product. Others not. |
| nurseCropNotAllowed | Potential values are [MONOCOTYL, DICOTYL, NONE, null, ""]. If a value is entered, this value is not allowed as per advice request to match this product. Others yes. |

TABLE 1-continued list of potential property fields used in the configuration data structure(s).

| Property Name | Description |
| --- | --- |
| commonTargetGrowthStageNotAllowed | Potential values are [EMERGENCE, FIRST_TRUE_LEAF_STAGE, SECOND_TRUE_LEAF_STAGE, THIRD_TRUE_LEAF_STAGE, THIRD_TRUE_LEAF_STAGE_EXCEEDED, null, ""]. If a value is entered, this value is not allowed as per Advice Request to match this product. Others yes. |
| recentCropSeedingDepthMIN | Lower limit of seeding depth which is allowed for this product containing this property. E.g. "5" cm - Advice Requests with less than 5 cm seeding depth won't be accepted to match this product. |
| recentCropSeedingDepthMAX | Upper limit of seeding depth which is allowed for this product containing this property. E.g. "5" cm - Advice Requests with more than 5 cm seeding depth won't be accepted to match this product. |
| alomyPressureNotAllowed | Potential values are [TRUE|FALSE, null or ""]. If this is set to TRUE, this product does not match to Advice Requests stating an AlomyPressure is HIGH - The others ["", null, NONE, LOW] would pass. |
| alomyPressureAllowed | Potential values are [TRUE|FALSE, null or ""]. If this is set to TRUE, this product does match to Advice Requests stating an AlomyPressure is HIGH - The others ["", null, NONE, LOW, HIGH] would also pass. |
| humusTypeNotAllowed | Potential values are [LowHumus, HighHumus]. If the value is listed e.g. "LowHumus" - the Advice will not be accepted. The others ["", null, HighHumus] would pass. |
| soilTypeNotAllowed | Potential values are according to USDA (but not limited to): ['CLAY', 'LOAM', 'SILT_LOAM', . . .]. If the value is listed e.g. "CLAY" - the Advice will not be accepted. The others ["", null, 'LOAM', 'SILT_LOAM'] would pass. |
| soilTypeAllowed | Potential values are according to USDA (but not limited to): ['CLAY', 'LOAM', 'SILT_LOAM', . . .]. If the value is listed e.g. "CLAY" - the Advice will be accepted. The others ["", null, 'LOAM', 'SILT_LOAM'] would not pass. |
| rootPenetrationDepthNotAllowed | Potential values are [FLAT, MIDDLE, DEEP]. If the value is listed e.g. "FLAT" - the Advice will be accepted. The others ["", null, MIDDLE, DEEP] would not pass. |
| pHValueUnderAllowed | e.g 7.0. If the value is below 7.0 - the Advice will be accepted. If above - the Advice will not be accepted. |
| pHValueAboveAllowed | e.g 6.5. If the value is above 6.5 - the Advice will be accepted. If below - the Advice will not be accepted. |
| mulchSeedingAsOtherConditionForFusariumAllowed | Potential values TRUE/FALSE. If TRUE mulchSeeding will be accepted for this Advice. If FALSE, mulchSeeding will not be accepted for this Advice. |
| tillageOperationNotAllowed | Potential values are [FLOWING_HARROW, ROLLER, PLOUGH, . . .]. If the value is listed e.g. "ROLLER" - the Advice will not be accepted. The others ["", null, FLOWING_HARROW, . . .] would pass. |
| tillageOperationAllowed | Potential values are [FLOWING_HARROW, ROLLER, PLOUGH, . . .]. If the value is listed e.g. "ROLLER" - the Advice will be accepted. The others beside ["", null] would not pass. |
| lastTillageOperationDaysNotLessThan | Defines how many days before the last tillage operation took place. If the number of days is less, the Advice cannot be given. |
| seedingDateMinBeforeDays | Defines how many days before the seeding took place. If the number of days is less, the Advice cannot be given. |

TABLE 1-continued list of potential property fields used in the configuration data structure(s).

| Property Name | Description |
| --- | --- |
| seedingMonthsNotAllowed | Defines the months in a season in which this Advice cannot be given. |
| cropVarietyAllowed | Lists the names of the Crop Varieties which are accepted so the Advice can be given. |
| cropVarietyNotAllowed | Lists the names of the Crop Varieties which are not accepted so the Advice cannot be given. |
| preceedingCropEppoCodeAllowed | Defined the Crop Eppo Codes which were applied the season before. If these Crops were seeded, the Advice cannot be given. |
| dayTemperatureBelowDegreesNotAllowed | Defines the lower temperature limit the product is allowed (E.g. 5 means, the product can be applied till 5 degrees but not below that value). |
| dayTemperatureAboveDegreesNotAllowed | Defines the upper temperature limit the product is allowed (E.g. 20 means, the product can be applied below 20 degrees but not above that value). |
| waterSupplyAllowed | Potential values are [BAD, NORMAL, GOOD], If the value is listed e.g. "GOOD" - the Advice will be accepted. The others ["", null, BAD, NORMAL] would not pass. |
| growingPlantStockNotAllowed | Potential values are [STRONG, MEDIUM, LOW], If the value is listed e.g. "STRONG" - the Advice will not be accepted. The others ["", null, MEDIUM, LOW] would pass. |
| notValidForTheseRegions | Defines Regions of a Country for which the Advice is not applicable. |
| notAllowed_IfTBZFreeCompliance_IsRequested | If set to True and TBZFreeCompliance is being requested, the Advice cannot be given. |

The property fields of illustrated and described in table 1 are only examples of property fields which may be used as part of the configuration data structures. A person skilled in the art may identify more or other properties as relevant for respective advice logic program generation.

Some of the property fields of table 1 may be part of the input which is received to specify a particular field condition. That is, for each potential value of such an input property a corresponding code snippet available to generate a respective code portion which performs an evaluation of the property with regards to a potential application of one or more protection products. After the logic generation, the complete decision tree covering all property fields and respective dependencies is implemented as the generated executable advice logic program. Table 2 illustrates examples of input properties which can be added to the basic input properties including a crop identifier with a particular target identifier and a particular growth stage code. The table has four sections. The first section includes a set of basic input parameters. The following sections include sets of input parameters which relate to the respective title of the section (Crop Season Object, Applied Tillage Operations, and Applied Products in Spray Jobs) which can be seen as subsections of the basic input properties. A person skilled in the art may define further input parameters.

TABLE 2 list of potential input property fields.

| Name | Type | Description |
| --- | --- | --- |
| countryCode | TEXT | Country |
| ZIPCode | TEXT | Nearest Postal Code of the Field or Farm |
| requestID | TEXT | Id of the requestor/partner |
| recentCropBBCHStage | TEXT | Affected Crop BBCH Stage |
| targets | Array of Objects of Targets | Treated Targets |
| farmUUID | Text | FMS-Internal UUID representation of the Farm |
| fieldUUID | Text | FMS-Internal UUID representation of the Field |
| currentCropSeason | Object CropSeason | Recent Crop |
| preceedingCropSeason | Object CropSeason | Preceeding Crop |
| nextCropSeason | Object CropSeason | Future Crop |
| SoilType | Text | ENUM - Accepted Values e.g. according to S, IS, sU ssL IU, sL uL L, utL tL T |
| humusContent | Number | Accepted values: 0-100 [%]. Useful values are 0-30. |

TABLE 2-continued list of potential input property fields.

| | | |
|---|---|---|
| soilMoisture | Text | [WET, DRY, NORMAL] |
| sprayjobs | Array of Objects of AppliedSprayJob | Previously applied spray jobs |
| nurseCrop | Text | ENUM [MONOCOTYL, DICOTYL, NONE] |
| ALSResistance | Boolean | True/False |
| ACCaseResistance | Boolean | True/False |
| alomyPressure | TEXT | [NONE, HIGH, LOW] |
| nightTemperaturesBelowMinus5Degrees | Boolean | True/False |
| nightTemperaturesBelowMinus1Degrees | Boolean | True/False |
| growthRegulatorAdviceRequested | Boolean | True/False |
| dayTemperatureBelow8Degrees | Boolean | True/False |
| dayTemperatureAbove20Degrees | Boolean | True/False |
| waterSupply | TEXT | [BAD, NORMAL, GOOD] |
| commonTargetGrowthStage | TEXT | [EMERGENCE, FIRST_TRUE_LEAF_STAGE, SECOND_TRUE_LEAF_STAGE, THIRD_TRUE_LEAF_STAGE, THIRD_TRUE_LEAF_STAGE_EXCEEDED] |
| rootPenetrationDepth | TEXT | [FLAT, MIDDLE, DEEP] |
| pHValue | Number | 0-14 (Decimal) |
| growingPlantStock | TEXT | STRONG\|MEDIUM\|LOW |
| TBZFreeCompliance | BOOLEAN | TRUE\|FALSE, empty means FALSE |
| nitrogenStabilizerAdviceRequested | BOOLEAN | TRUE\|FALSE |
| strawBalesForStrawBalesCrops | BOOLEAN | TRUE\|FALSE |

Crop Season Object

| Name | Type | Description |
|---|---|---|
| crop | Object | Crop with Crop Name and Crop Eppo Code |
| cropVariety | Object | Name of the Crop Variety |
| seedingDate | Date | Date it was sprayed |
| seedingDepth | Number | Expected in cm, e.g. "10.3" cm |
| seedRate | Number | Expected seeds per $m^2$ (e.g. "250.5") |
| tillageOperations | Array of TillageOperation Objects | tillageOperations of the season |
| mulchSeeding | Boolean | True/False (applies to seeding job) |
| yieldExpectation | Number | Tons per Hectar (1.2) t/ha |

Applied Tillage Operations

| Name | Type | Description |
|---|---|---|
| tillageOperation | TEXT | e.g. [FLOWING_HARROW, ROLLER, PLOUGH, HARROW, CULTIVATOR] |
| tillageOperationDate | DATE | Date the tillage was performed |

Applied Products in Spray Jobs

| Name | Type | Description |
|---|---|---|
| productName | Text | Name of the applied product |
| registrationNumber | Text | Registration Number of the Product |
| executionDate | Date | Date it was sprayed |

The name column includes possible input parameter names which are known by the generated advice program logic. The Type column specifies the type of the input parameter. Some input parameters have an array type which allows to transmit multiple values in parallel. The "Description" column explains the meaning of the respective input parameters. The logic generator includes statements which are configured to generate the code portions in the advice program logic based on respective code snippets. The code portions are using the input data from the table 2 during the execution of the previously generated advice logic.

Figure 5:
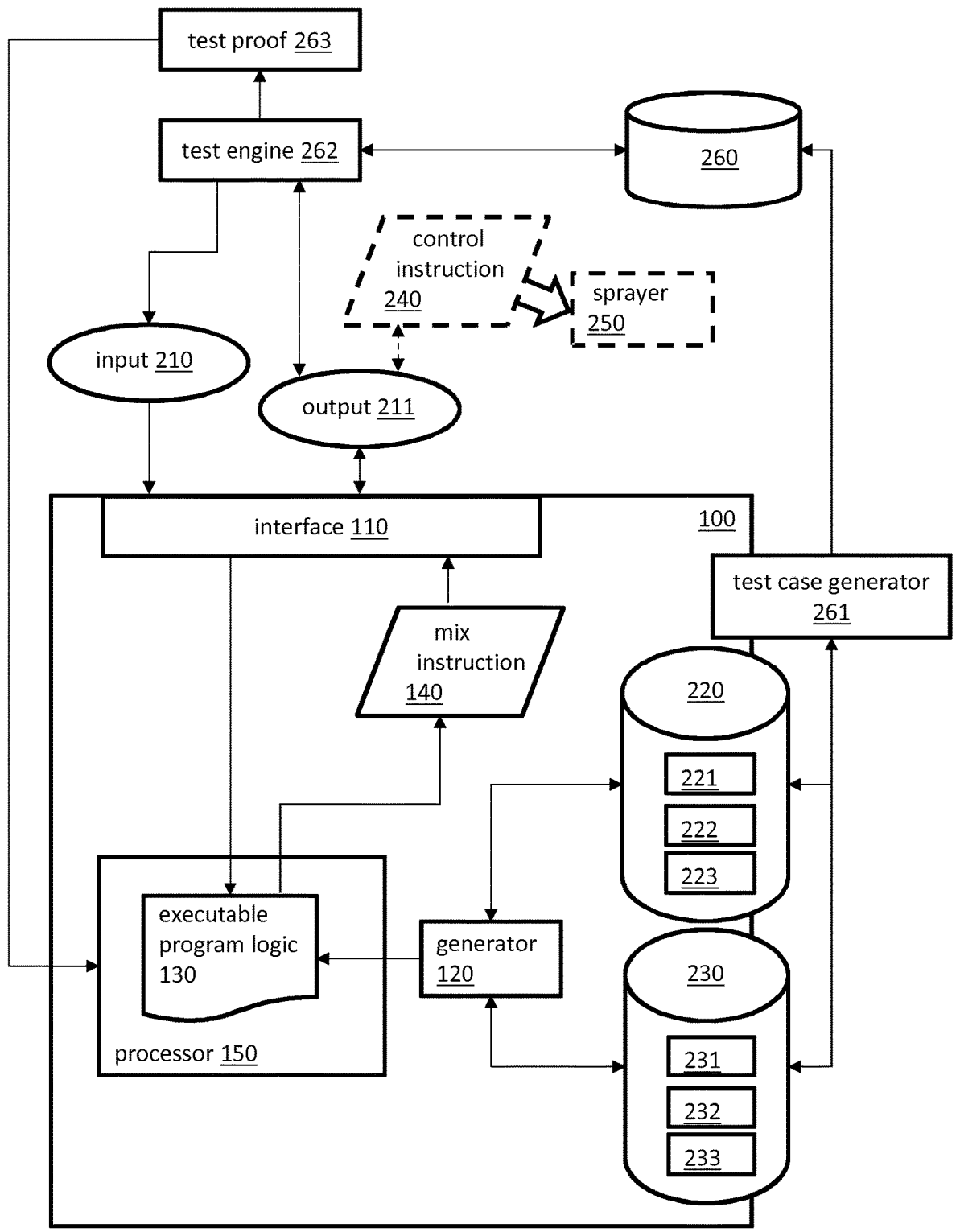
FIG. 5 shows an embodiment of the computer system with extension modules implementing a verification function for generated advice program logic.
Figure 6:
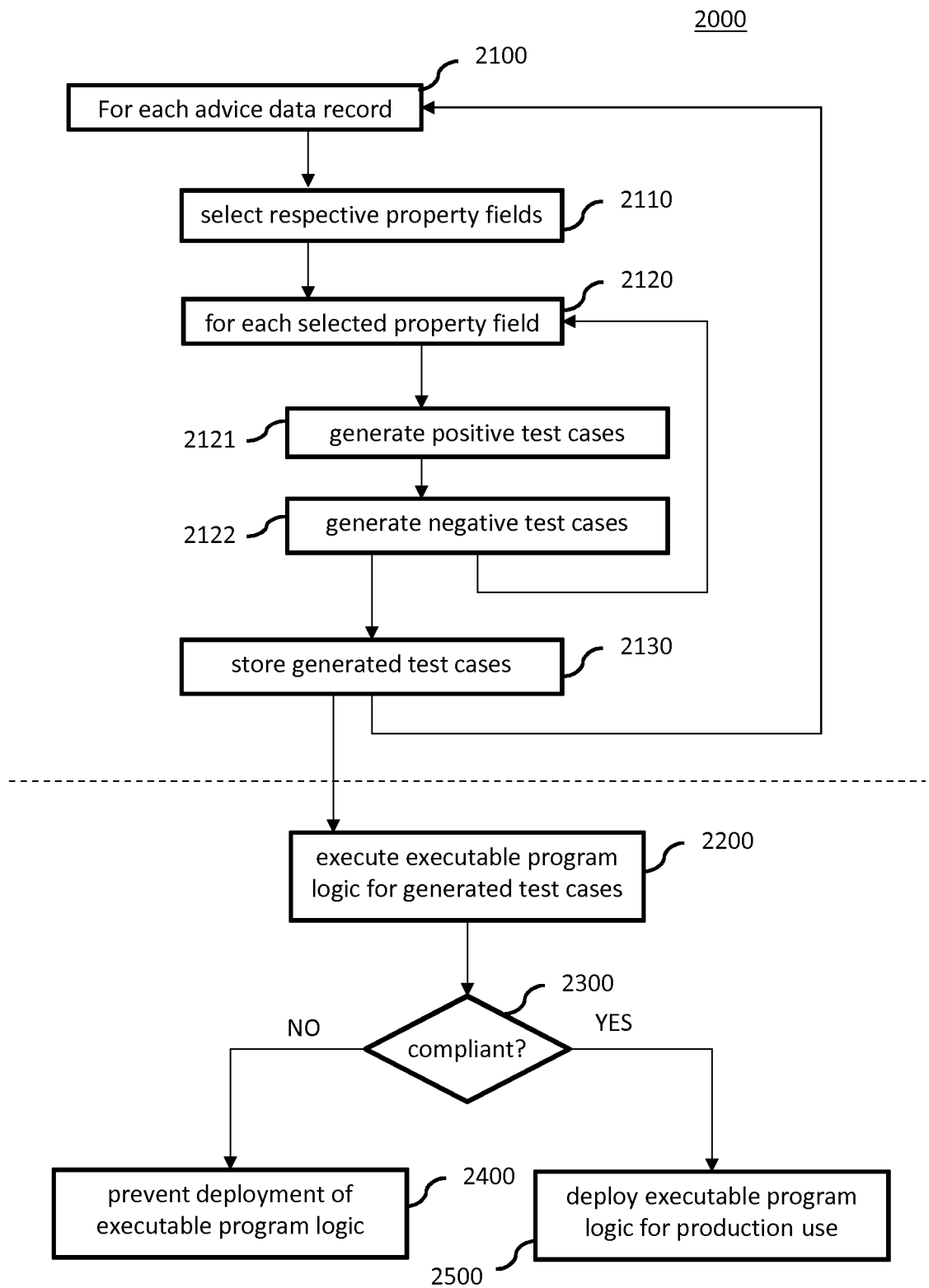
FIG. 6 is a simplified flow chart illustrating optional steps for program logic verification.

FIG. 5 shows an embodiment of the computer system 100 with optional extension modules 260 to 263 implementing a verification function for generated advice program logic 130. FIG. 6 is a simplified flow chart 2000 illustrating optional steps for program logic verification wherein such steps are performed by said extension modules. In the following, description FIG. 5 is explained in the context of FIG. 6 with making reference to reference numbers of both figures. It is to be noted that in FIG. 5, the extension modules are not drawn as integrated modules of the computer system 100 because they can be implemented as a separated test system which is communicatively coupled with the computer system 100. However, some or all of the extension modules may also be implemented as integrated components of the computer system 100.

In the embodiment of FIG. 5, the robustness of the generated advice logic 130 can be verified against predefined test cases. For example, deployment of the generated advice logic program may only occur if tests based on said test cases are successfully passed. In one embodiment, the test cases can also be used during operation of the system when determining a product mix instruction to verify the determined mix instruction.

Test cases can be positive or negative test cases. Typically, a test case refers to a particular test parameter (property field) which is varied in combination with a fixed set of further parameters. For example, coming back to the example of winter barley, the range of growth stage codes [BBCHfrom, BBCHto] for which a particular product is applicable reaches from 11 to 13 for a given field situation. There are positive test cases for the parameters BBCHfrom and BBCHto and there are negative test cases for the parameters (BBCHfrom−1) and (BBCHto+1). When an input is received which has a growth stage code inside the defined interval, the execution of the generated advice logic program can lead to a specific product mix instruction. The correctness of the determined product mix instructions can immediately be verified by applying the set of test cases. If the result is covered by a negative test case then the product mix must not be applied.

The extension modules test case database 260, test case generator 261, test engine 262 and test proof 263 can be used to implement such verification function. In an initialization step 2100 (cf. FIG. 5, steps above the dashed line), the test case generator 261 creates positive and negative test cases for each advice data record on the basis of the configuration data sets 220. For each advice data record, the test case generator selects 2110 the property fields of the current advice data record. In other words, a loop is performed over all advice data records and with each loop iteration the next advice data record is processed. Once an advice data record is selected, a loop is performed of all property fields of the selected record. For each selected property field, the test case generator generates 2121 one or more positive test cases corresponding to the property value of the current property field or to a value within a range defined by the current property value. In other words, positive test cases are correlated with property values which are supposed to generate a mix instruction when a respective input is received. Further, one or more negative test cases are generated 2122 based on modifications of the current property field value. In cases where a defined range is specified by the property field(s), the modifications include values which are outside the defined range. The test case initialization is then finished with the step of storing 2130 the generated test cases in the test case database 260.

The test engine 262 can then retrieve (test) input information 210 from the test case data base 260 and provide the (test) input to the processor 150 to execute 2200 the executable program logic 130 with input data 210 from the generated test cases 260. Based on the test input the execution of the program logic 130 provides one or more mix instructions 140 which are forwarded as output 211 to the test engine 262.

The test engine 262 can now feed the test proof module 263 with the received output 211 and the information of an expected output according to the retrieved test case information. Based on this information, the test proof module 263 verifies 2300 the executable program logic by checking whether the generated mix instructions are in compliance with the positive test cases. In case of non-compliance (i.e., the mix instruction includes a negative test case result), the test proof module 263 can send instructions to the processor 150 to prevent 2400 the executable program logic from being deployed for production. In case of compliance, it can send instructions to deploy 2500 the executable program logic for production use. This procedure guarantees that no faulty mix instructions 140 can be generated which might lead to a treatment of the respective target actually harming the crop.

Especially in situations, where the configuration data may have changed recently (e.g., new protection products being added or application parameters being changed) the generator 120 can generate an updated executable program logic in near-real-time. In parallel the test case generator 261 can generate the respective test cases and the generated program logic 130 can immediately be tested which allows its instantaneous redeployment even in situations where a farmer is already working on a field and has just recognized a target. The disclosed system and methods allow for highly reliable, near-real-time application of the optimal spray mix based on the most recent configuration data.

To summarize, in first phase the executable advice program logic is generated based on predefined code snippets and configuration data. In a second (optional) phase, the program logic can be verified through negative and positive test cases. In a third phase, the executable (verified) program logic is applied to input properties describing a real world field situation to generate a product mix instruction. And in a fourth (optional) phase, the product mix instruction is used as a basis to control the sprayer appliance for distributing a corresponding protection product mix on the real world field. It is to be noted, that the third phase can be executed in near-real time to redeploy the program logic in cases where changes of code snippets or configuration data have occurred.

FIG. 7 illustrates a table 260 with example test cases in relation to the configuration data example of FIG. 4. The table shows 10 test cases (Test Case ID 1 to 10) in relation to the advice data record 222-1 (cf. FIG. 4) for combinations of property fields where some of the property field values are modified. Modified values are illustrated by cells with dotted background patterns. All test cases in the example related to the segment "Insecticide". The "Expected Result" column shows that only for the positive test cases 1 and 2 a generated mix instruction is expected (expected result=1). For all other (negative) test cases there is at least one modification which either includes a deviating property value or where the modified property value falls outside a predefined range. For example, the predefined range for the BBCH codes of the advice data record 222-1 is the interval [11, 13]. For the test cases 3 and 4 the respective values are 10 and 14 in the column "Recent Crop BBCH Stage" which both fall outside the allowed predefined range. Therefore, no mix instruction is to be generated for these property values (expected result="false"). Further, in test case 5, the value of the column "spring Or Autumn Application" is "Spring". However, the related product data record 223-1 (cf. FIG. 4) defines the applicability for autumn only (cf. 223-P6 in FIG. 4). Therefore, the modified property value "Spring" leads the expected result "false" (no mix instruction). Test cases 6 and 7 relate to modified target values. According to 223-P1 (cf. FIG. 4) the only allowed target eppo code is APHIS which deviates from the modified property values in the test cases and lead to expected results "false". In test cases 8 and 9, country and region values are modified. According to the crop data record 221-1 (to which the advice data record 222-1 relates) the advice is only valid for the country "DE" (cf. 221-P4) and the region "RP" (cf. 221-P5). Therefore, both modifications lead to a negative test case ("false"). Finally, test case 10 has a modified values in the columns "Recent Crop" and "Recent Crop Eppo Code" which are not in line with the configuration data structure of FIG. 4 and therefore also represents a negative test case.

Figure 8:
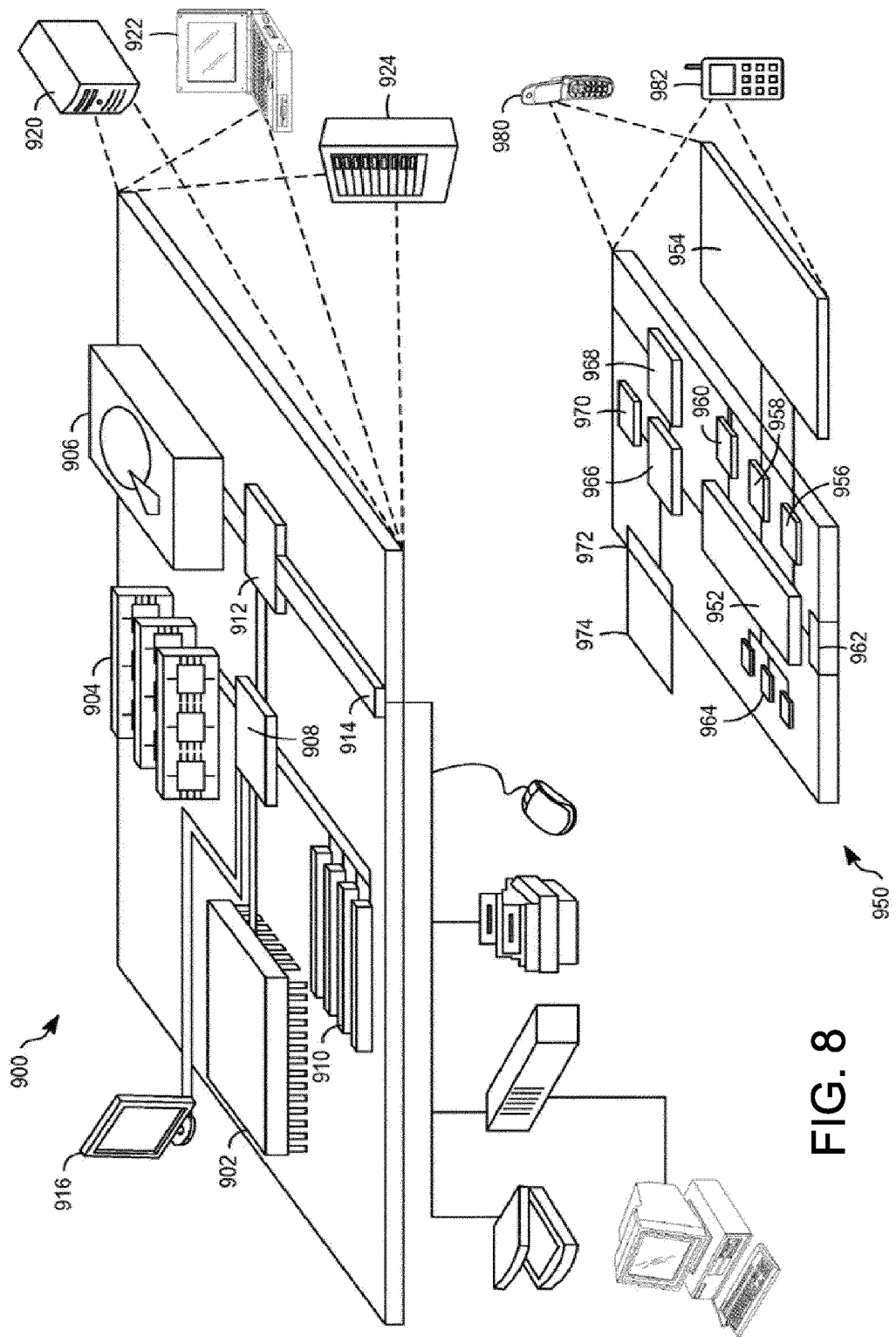
FIG. 8 is a diagram that shows an example of a generic computer device and a generic mobile computer device, which may be used in embodiments of the invention.

FIG. 8 is a diagram that shows an example of a generic computer device 900 and a generic mobile computer device 950, which may be used with the techniques described here. In some embodiments, computing device 900 may relate to the system 100 (cf. FIG. 1). Computing device 950 is intended to represent various forms of mobile devices, such as personal digital assistants, cellular telephones, smart phones, and other similar computing devices. In the context of this disclosure, the computing device 950 may be used as a frontend by a farmer operating in a field to capture the current field situation for the input which is then provided to the device 900 to execute the generated program logic. In other embodiments, the entire system 100 may be implemented on the mobile device 950. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method (1000) for optimization of crop protection, the method comprising:
   accessing (1100) one or more configuration data structures (220) wherein the one or more configuration data structures include data fields to store:
   crop data (221) wherein a crop data record (221-1) stores at least crop identifier information for a particular crop and properties regarding the applicability of various protection product segments for the particular crop, advice data (222) related to respective crop data wherein each advice data record (222-1, 222-2, 222-3) stores advice identifier information and properties regarding recommendations for the related crop with regards to a respective protection product segment, and
   crop protection product data (223) related to respective advice data wherein each crop protection product data record (223-1, 223-2, 223-3, 223-4) stores identifier information about a particular protection product for at least one specific target, and product application properties in relation to the related advice data record, each target describing a particular infestation or a particular crop disease;

accessing (1200) a plurality of code snippets (230) wherein each code snippet (231, 232, 233) has a condition which relates either to at least one property field of the one or more data structures (220) or to a result of another code snippet, and further includes generic program logic associated with the condition, and wherein each property field is used in the condition of at least one code snippet;

applying (1300) the plurality of code snippets to the one or more configuration data structures to generate an advice logic program (130) by transforming the generic program logic of each code snippet into executable program logic in compliance with the respective conditions and respective data field values;

receiving (1400) input comprising at least a particular crop identifier, a particular target identifier and a particular crop growth stage code representing a real world field situation; and applying (1500) the generated advice logic program to the received input to generate a crop protection product mix instruction for treatment of the real world field situation.

2. The method of claim 1, further comprising:
providing (1600) the generated crop protection product mix instruction (140) as control instruction (240) for a sprayer appliance (250) to generate a tank mix with one or more crop protection products in accordance with the generated advice logic program.

3. The method of claim 1, wherein the respective protection product segment is selected from the group of: insecticide (i), fungicide (f), herbicide (h), nitrogen stabilisators (n), growth regulators (g), nematicides, molluscicides, rodenticides, acaricides, bactericides, algaecides, antimicrobials, fertilizers, soil amendments, soil additives and a combination of two or more of said segments.

4. The method of claim 1, further comprising:
for each advice data record:
   selecting (2110) the property fields of the current advice data record;
   for each selected property field:
      generating (2121) one or more positive test cases corresponding to the property value of the current property field or to a value within a range defined by the current property value; and
      generating (2122) one or more negative test cases based on modifications of the current property field value, and in case of the defined range, the modifications being outside the defined range; and
   storing (2130) the generated test cases in a test case database (260).

5. The method of claim 4, further comprising:
executing (2200) the executable program logic with input data from the generated test cases;
verifying (2300) the executable program logic by checking whether the generated mix instructions are in compliance with the positive test cases;
in case of non-compliance, preventing (2400) the executable program logic from being deployed for production; and
in case of compliance, deploying (2500) the executable program logic for production use.

6. The method of claim 4, further comprising:
executing the executable program logic with input data reflecting a real world field situation;
checking whether the generated mix instructions are in compliance with the positive test cases;
in case of non-compliance, discarding the generated mix instruction (140); and
in case of compliance, transforming the generated mix instruction 140 into a system output (211).

7. A computer program product for optimization of crop protection, comprising instructions that when loaded into a memory of a computer system and being executed by at least one processor of the computer system cause the computer system to perform the method steps according to claim 1.

8. A computer system (100) for optimization of crop protection, the system comprising:
a generator module (120) configured
   to access one or more configuration data structures (220) wherein the one or more configuration data structures include data fields to store:
      crop data (221) wherein a crop data record (221-1) stores at least crop identifier information for a particular crop and properties regarding the applicability of various protection product segments for the particular crop,
      advice data (222) related to respective crop data wherein each advice data record (222-1, 222-2, 222-3) stores advice identifier information and properties regarding recommendations for the related crop with regards to a respective protection product segment, and
      crop protection product data (223) related to respective advice data wherein each crop protection product data record (223-1, 223-2, 223-3, 223-4) stores identifier information about a particular protection product for at least one specific target, and product application properties in relation to the related advice data record, each target describing a particular infestation or a particular crop disease;
   and further configured to access a plurality of code snippets (230) wherein each code snippet (231, 232, 233) has a condition which relates either to at least one property field of the one or more data structures (220) or to a result of another code snippet, and further includes generic program logic associated with the condition, and wherein each property field is used in the condition of at least one code snippet;
   and further configured to apply the plurality of code snippets to the one or more configuration data structures to generate an advice logic program by transforming the generic program logic of each code snippet into executable program logic (130) in compliance with the respective conditions and respective data field values;
an interface (110) configured to receive input (210) comprising at least a particular crop identifier, a particular target identifier and a particular crop growth stage code representing a real world field situation; and
a processor module (150) configured to apply the generated advice logic program (130) to the received input (210) to generate a crop protection product mix instruction (140) for treatment of the real world field situation.

9. The system of claim 8, wherein the computer system further comprises a conversion module configured:
to convert the generated crop protection product mix instruction (140) into a control instruction (240) for a sprayer appliance (250) to generate a tank mix with one or more crop protection products in accordance with the generated advice logic program wherein the control instruction (240) is provided to the sprayer appliance (250) by the interface (110).

10. The system of claim 8, wherein the respective protection product segment is selected from the group of: insecticide (i), fungicide (f), herbicide (h), nitrogen stabilisators (n), growth regulators (g), nematicides, molluscicides, rodenticides, acaricides, bactericides, algaecides, antimicrobials, fertilizers, soil amendments, soil additives and a combination of two or more of said segments.

11. The system claim 8, wherein the generator (120) includes a list of ordered statements (S1 to Sn) with each statement referencing a respective code snippet.

12. The system of claim 8, further comprising:
a test case generator module (261) configured to generate (2100) one or more test cases for each advice data record by
selecting (2110) the property fields of the current advice data record;
for each selected property field:
generating (2121) one or more positive test cases corresponding to the property value of the current property field or to a value within a range defined by the current property value; and
generating (2122) one or more negative test cases based on modifications of the current property field value, and in case of the defined range, the modifications being outside the defined range; and
storing (2130) the generated test cases in a test case database (260).

13. The system of claim 12, further comprising:
a test engine (262) configured to trigger execution of the executable program logic (130) with input data (210) from the generated test cases (260);
a test proof module (263) configured to verify the executable program logic by checking whether the generated mix instructions (140) are in compliance with the positive test cases, and to prevent the executable program logic from being deployed for production in case of non-compliance, and to deploy the executable program logic for production use in case of compliance.

* * * * *

UNITED STATES PATENT AND TRADEMARK OFFICE
CERTIFICATE OF CORRECTION

PATENT NO. : 11,593,897 B2
APPLICATION NO. : 16/649696
DATED : February 28, 2023
INVENTOR(S) : Klaus Stenzel et al.

Page 1 of 1

It is certified that error appears in the above-identified patent and that said Letters Patent is hereby corrected as shown below:

In the Claims

Column 32, Line 6, "140" should be -- (140) --.

Column 33, Line 10, "system claim 8," should be -- system of claim 8, --.

Signed and Sealed this
Second Day of September, 2025

Coke Morgan Stewart
*Acting Director of the United States Patent and Trademark Office*